Figure 1:
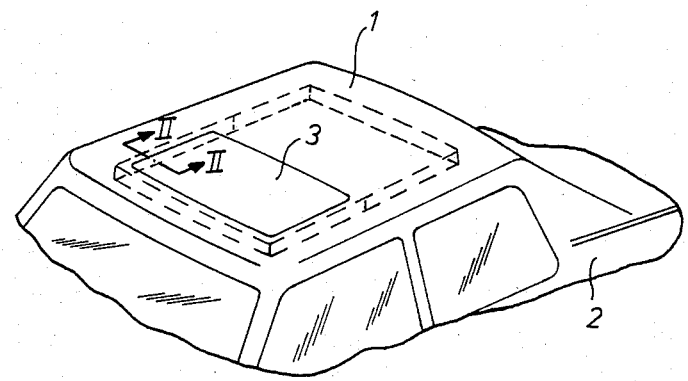

United States Patent [19]

Bienert et al.

[11] Patent Number: 4,509,791
[45] Date of Patent: Apr. 9, 1985

[54] RIGID COVER FOR A VEHICLE TOP

[75] Inventors: Horst Bienert, Gauting; Georg Kohlpaintner, Maisach; Hans Jardin, Inning, all of Fed. Rep. of Germany

[73] Assignee: Webasto-Werk W. Baier GmbH & Co., Fed. Rep. of Germany

[21] Appl. No.: 317,983

[22] Filed: Nov. 4, 1981

[30] Foreign Application Priority Data

Nov. 4, 1980 [DE] Fed. Rep. of Germany ....... 3041505

[51] Int. Cl.³ .............................................. B60J 7/00
[52] U.S. Cl. .................................... 296/216; 296/97 F
[58] Field of Search ............... 296/216, 220, 221, 222, 296/97 F

[56] References Cited

U.S. PATENT DOCUMENTS 3,698,761 10/1972 Niwa ................................. 296/97 F
4,312,534  1/1982 Jardin ................................. 296/216
4,358,151 11/1982 Wood ................................. 296/216

FOREIGN PATENT DOCUMENTS 2033850  5/1980 United Kingdom ................. 296/222

Primary Examiner—Bruce H. Stoner, Jr.
Assistant Examiner—John A. Carroll
Attorney, Agent, or Firm—Sixbey, Friedman & Leedom

[57] ABSTRACT

A rigid cover for a sliding and/or outward moving top of a vehicle, with the cover being adapted to shut or close an opening in the top of the vehicle when in a closed position and being movable from the closed position to an open and/or outwardly extended position in which the opening in the top is at least partially open. The rigid cover includes a cover plate made of a translucent material with a frame supporting a bottom of a peripheral edge of the cover plate and an upper frame in contact with the top of a cover plate. The upper and lower frames are rigidly interconnected and the edge of the cover plate is secured between the two frames.

18 Claims, 2 Drawing Figures

U.S. Patent   Apr. 9, 1985   4,509,791

RIGID COVER FOR A VEHICLE TOP

The present invention relates to a cover arrangement and, more particularly, to a rigid cover for a sliding and/or outward moving vehicle top which is adapted to shut or close an opening when the top is in a closed position, with the top also being movable from the closed position to an open and/or outwardly extended position, in which open position the top is at least partially cleared.

In, for example, Gebrauchsmuster No. 7,912,486, (corresponding to U.S. Pat. No. 4,312,534) a vehicle top's construction is proposed wherein an upper frame is mounted on an upward extending arm of a lower frame. In a closed position of a cover for the vehicle top, a lateral edge of the upper frame is in contact with a seal attached to the fixed portion of the top and extending around the opening in the top of the vehicle.

A disadvantage of rigid covers of the aforementioned type resides in the fact that, since it has been found in practice that the cover plate, made generally of a glass or translucent plastic, tends to warp especially in response to variations in temperature, the proposed cover plates no longer adapt or conform to the design curvature of the top of the vehicle. Such warping is undesirable not only for the reasons of overall appearance of the top of the vehicle, but also the warping may result in sealing problems, the generation of wind noises, or the like.

A further disadvantage of the aforementioned type of proposed rigid covers resides in the fact that the upper frame, in the form of an ornamental frame, together with the lower frame are incapable of preventing undesirable deformations or warping of the cover plate.

The aim underlying the present invention essentially resides in providing a more stable rigid cover for a motor vehicle which may be produced at relatively low costs.

In accordance with advantageous features of the present invention, a rigid cover for a vehicle sliding and/or outward moving top is provided wherein a frame supporting a bottom of an edge of the cover plate and an upper frame in contact with the top of the cover plate are rigidly interconnected with an edge of the cover plate being secured between the two frames.

In accordance with further advantageous features of the present invention, the secured cover plate and two frames enclose a chamber which extends along a periphery of the cover plate, with the chamber being filled with a sealing material. By virtue of these features, a penetration of water or the like along an edge of the cover plate is reliably prevented by the sealant-filled chamber extending along the periphery of the cover plate. Advantageously, in accordance with the present invention, at least one vent is provided in the chamber so as to enable an evaporation of the plasticizer of the sealing material therethrough. Consequently, the sealing material plasticizer need not be vaporized prior to a final assembly of the rigid cover.

Advantageously, one of the upper and lower frames includes an arm which is provided with a seal adapted to come into contact with portions of the fixed portion of the top of the vehicle in a closed position of the cover.

In order to provide for a particularly high strength of a unit formed by the cover plate and the upper and lower frames, a lip of the lower frame is forced or retained in a recess of the upper frame. The lip may be forced into the recess of caulking i.e. the recess means and the lip means comprise a catch means by which the lip means is held in the recess means.

According to the present invention, the lip may be provided with slots connected to the chamber, with portions of the other frame being forced into the slots by caulking to produce the rigid connection between the two frames i.e. the recess means and the lip means comprise a catch means by which the lip means is held in the recess means.

Advantageously, the lip has a shape which corresponds to a shape of a top of the cover plate, with a top of the lip being separated from a portion of the lower frame in contact with the cover plate by a vertical spacing corresponding to a thickness of the cover plate.

According to the present invention, the arm is provided on the upper frame and projects downwardly with the seal being placed on the arm from the bottom. Since the seal is placed from the bottom of the arm which extends downward from the upper frame, undesired displacements of the seal are very effectively prevented during an operation of the cover.

In accordance with still further features of the present invention, at least one side of the arm is provided with at least one indentation. The seal is provided with at least one retaining projection which is adapted to be accommodated in the at least one indentation. By virtue of the provision of retaining projections which engage in the indentations in the arm, a further support is provided for the seal.

In order to further simplify the assembly of the cover of the present invention, a contact surface or bottom portion extends from the arm toward the cover plate and constitutes a seal abutment which determines the vertical position of the seal.

Advantageously, the lower frame of the present invention may be in the form of a shaped sheet metal element, with the upper frame being in the form of a light metal extrusion.

By virtue of the prevention of penetration of water along the edge of the cover plate by the provision of a sealtant filled chamber in accordance with the present invention, when the bottom of the cover plate formed of, for example, glass, carries a splinter protection sheet, humidity is also prevented from penetrating between the cover plate and the protective sheet.

Accordingly, it is an object of the present invention to provide a rigid cover for a vehicle top which avoids, by simple means, shortcomings and disadvantages encountered in the prior art.

Another object of the present invention resides in providing a rigid cover for a vehicle top which is simple in construction and therefore relatively inexpensive to manufacture.

Yet another object of the present invention resides in providing a rigid cover for a vehicle top which reliably prevents a penetration of water along an edge of the cover plate.

Figure 2:
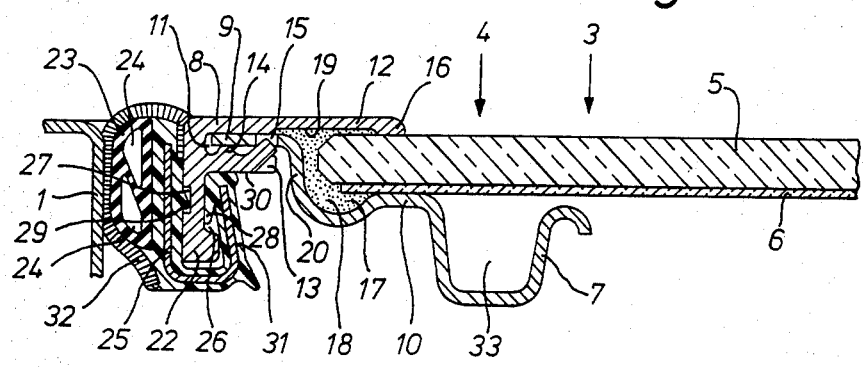

These and other objects, features, and advantages of the present invention will become more apparent from the following description when taken in connection with the accompanying drawing which shows, for the purposes of illustration only, one embodiment in accordance with the present invention, and wherein:

FIG. 1 is a partially schematic perspective view of a vehicle provided with a sliding top constructed in accordance with the present invention; and FIG. 2 is a cross sectional view, on an enlarged scale, taken along the line II—II in FIG. 1.

Referring now to the drawing wherein like reference numerals are used in both views to designate like parts and, more particularly, to FIG. 1, according to this figure, a vehicle 2 is provided with a fixed top or roof portion 1 having arranged therein a top opening generally designated by the reference numeral 3. The top opening 3 is adapted to be shut or closed by a rigid cover, when the cover is moved to a closed position. Optionally, the cover may be moved to a position in which the top opening 3 is at least partially cleared or open.

As shown most clearly in FIG. 2, the rigid cover generally designated by the reference numeral 4 includes a cover plate 5 made of a translucent material such as, for example, glass. A bottom of the cover plate 5 is covered by an adhesive splinter-protection sheet 6. The peripheral edge of the cover plate 5 is supported at the bottom thereof by a lower frame member 7 which is fashioned in the shape of a sheet-metal element. An upper frame member 8 is applied to the top of the cover plate 5, and the upper and lower frame members 7,8 are rigidly interconnected and have a thickness or spacing which is sufficient to secure the edge of the cover plate 5.

The lower frame member 7 is provided with a lip portion 9 having a shape corresponding to that of the top of the cover plate 5. A top surface portion of the lip 9 is separated or spaced from a top surface of a portion 10 of the lower frame 6 in contact with the bottom of the cover plate 5 by a distance corresponding to a thickness of the cover plate 5 including the thickness of the protective sheet 6. The lip 9 penetrates or extends into a recess 11 provided in the upper frame, with the recess 11 being limited or defined between a substantially horizontal arm 12 and a shorter arm 13 disposed in parallel thereto, with the arms 12, 13 forming a portion of the upper frame 8. A projection 14 of the arm 13 maintains the engagement of the lip 9 with the arm 12. The lip 9 is provided with slots 15 and, during assembly of the cover 4, the material of the arm 13, as shown in FIG. 2, is pressed into the slot 15 by caulking.

An inner edge 16 of the arm 12 lies or is disposed on the top of the cover plate 5. A chamber 18, filled with a sealing material 17, is limited or defined between a groove 19 and a bottom of the arm 12, the cover plate 5, and an adjacent portion 20 of the lower frame member 7. The chamber 18 is connected to the slots 15 provided in the lip 9 by the groove 19. In the illustrated embodiment, the sealing material 17 extends all around the edge of the cover plate 5 and the protective sheet 6.

The upper frame member 8 also includes an arm 22 which extends substantially vertically downward, with a seal 23 being placed or arranged on the extension from the bottom thereof. The seal 23 is provided, in a conventional manner, with air chambers 24 and a metallic reinforcing insert 25. Indentations 26, 27 are provided on both sides of the arm 22, with the indentations 26, 27 being adapted to accommodate retaining projections 28, 29 of the seal 23. A bottom 30 of the arm 13 constitutes a seal abutment with which an inner arm 31 of the seal 23 is in contact and therefore determines a vertical position of the seal 23. The seal 23 is provided with a grained or roughened surface, or as shown in FIG. 2, is flocked to form a brush-like fiber layer 32. However, it is noted that such flocking is conventional per se and shown, for example, on the seals of U.S. Pat. Nos. 3,905,641 and 3,949,624.

The upper frame member 8 is suitably fashioned as a light-metal extrusion and is peripherally divided into at least two parts. Thus, for example, the upper frame member may be formed of two substantially U-shaped portions as viewed in a plan view (schematically depicted in FIG. 1), with the portions being laterally pushed onto the lip 9 of the lower frame member and the cover plate after the sealing material 17 has been introduced into the chamber. The slots 15 may function as venting slots so as to enable a plasticizer of the sealing material 17 to evaporate therethrough thereby eliminating the need for the vaporization of the plasticizer prior to the final assembly of the cover 4. If desired, a sealing strip (not shown) may be introduced into a channel 33 provided in the lower frame member 7.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. In a rigid cover means for closing and at least partially opening an opening in a roof of a vehicle, the cover means including a cover plate formed of a translucent material and frame means for supporting a peripheral edge of the cover plate at the opening in the roof, the frame means including an upper frame member adapted to contact a top of the cover plate and a lower frame member adapted to support a bottom of the cover plate, the improvement for preventing deformations or warping of the cover plate comprising said upper and lower frame members being of a thickness and being rigidly interconnected in a fixed relationship with respect to each other so as to secure the peripheral edge of the cover plate, the lower frame member being a shaped sheet metal part and the upper frame member being an extrusion of light metal, wherein the means for rigidly interconnecting the upper and lower frame members include a lip means provided on the lower frame member and a recess means formed in the upper frame member for accommodating the lip means, and wherein the recess means and the lip means comprise a catch means by which the lip means is held in the recess means.

2. A rigid cover means according to claim 1, characterized in that means are provided for preventing a penetration of liquid along an edge of the cover plate including chamber means provided along a peripheral edge of the cover plate, and in that a sealing material is accommodated in the chamber means.

3. A rigid cover means according to claim 2, characterized in that the chamber means is defined by a cover plate in the upper and lower frame members.

4. A rigid cover means according to claim 2, characterized in that means are provided for venting the chamber means to the outside.

5. A rigid cover member according to claim 4, characterized in that the upper frame member includes an arm portion, a sealing means being mounted on the arm portion and arranged so as to come into contact, in an installed condition in a vehicle roof, with fixed portions of the roof of the vehicle when the cover means is in a closed position.

6. A rigid cover member according to claim 1, characterized in that the lip means includes a slot means communicating with the chamber means, and in that the means for interconnecting includes means provided on the upper frame member adapted to be forced into the slot means by caulking means.

7. A rigid cover member according to claim 6, characterized in that the lip means has a shape corresponding to a shape of the top of the cover plate, the lower frame member includes a portion in contact with the cover plate, and in that a vertical distance between a top surface of the lip means and a surface of the portion of the lower frame member in contact with the cover plate corresponds at least approximately to a thickness of the cover plate.

8. A rigid cover member according to claim 7, characterized in that the arm portion is provided on the upper frame member and extends in a downward direction, and in that the sealing means is disposed on the arm portion from a bottom end thereof.

9. A rigid cover member according to claim 8, characterized in that means are provided for retaining the sealing means at the arm portion, and in that means are provided on at least one side of the arm portion for accommodating the retaining means.

10. A rigid cover member according to claim 9, characterized in that the retaining means includes at least one projection and the means for accommodating the retaining means includes at least one indentation formed in the arm portion.

11. A rigid cover member according to claim 9, characterized in that means are provided on one of the frame members for determining a vertical positioning of the sealing means.

12. A rigid cover member according to claim 11, characterized in that the vertical positioning determining means includes a contact surface formed on the upper frame member for forming a seal abutment with the sealing means.

13. A rigid cover member according to claim 1, characterized in that the upper frame member is peripherally divided into at least two parts.

14. A rigid cover member according to claim 1, characterized in that a protective sheet means is provided along an inner surface of the cover plate.

15. A rigid cover member for closing and at least partially opening an opening of a roof of a vehicle, the cover means including a cover plate formed of a translucent material and frame means for supporting a peripheral edge of the cover plate at the opening in the roof, the frame means including an upper frame member adapted to contact a top of the cover plate and a lower frame member adapted to support a bottom of the cover plate, and in that means are provided for rigidly interconnecting the upper and lower frame members to each other so as to enable the peripheral edge of the cover plate to be secured between the upper and lower frame members, and wherein the means for rigidly interconnecting the upper and lower frame members include a lip means provided on the lower frame member and a recess means formed in the upper frame member for accommodating the lip means, the lip means including a slot means, and in that the means for interconnecting includes means provided on the upper frame member adapted to be forced into the slot means and comprising a catch means with said slot means.

16. A rigid cover member according to claim 15, characterized in that means are provided for retaining a sealing means at the arm portion, and in that means are provided on at least one side of the arm portion of accommodating the retaining means.

17. A rigid cover member according to claim 16, characterized in that means are provided on one of the frame members for determining a vertical positioning of the sealing means.

18. In a rigid cover means for closing and at least partially opening an opening in a roof of a vehicle, the cover means including a cover plate formed of a translucent material and frame means for supporting a peripheral edge of the cover plate at the opening in the roof, the frame means including an upper frame member adapted to contact a top of the cover plate and a lower frame member adapted to support a bottom of the cover plate, the improvement for preventing deformations or warping of the cover plate comprising said upper and lower frame members being of a thickness and being rigidly interconnected in a fixed relationship with respect to each other so as to secure the peripheral edge of the cover plate, the lower frame member being a shaped sheet metal part and the upper frame member having an extrusion of light metal, wherein the means for rigidly interconnecting the upper and lower frame members comprises physically interengageable locking means on said frame members.

* * * * *